US012489241B2

(12) United States Patent
Jost et al.

(10) Patent No.: US 12,489,241 B2
(45) Date of Patent: Dec. 2, 2025

(54) CONNECTION STRIP AND METHOD OF MANUFACTURING THE CONNECTION STRIP

(71) Applicant: WEIDMÜLLER INTERFACE GMBH & CO. KG, Detmold (DE)

(72) Inventors: Matthias Jost, Oerlinghausen (DE); Christian Fuchs, Wutha-Farnroda (DE); Tim Knauf, Eisenach (DE); Peter Stuckmann, Lage (DE); Matthias Lammersen, Detmold (DE)

(73) Assignee: WEIDMÜLLER INTERFACE GMBH & CO. KG, Detmold (DE)

(*) Notice: Subject to any disclaimer, the term of this patent is extended or adjusted under 35 U.S.C. 154(b) by 471 days.

(21) Appl. No.: 17/854,400

(22) Filed: Jun. 30, 2022

(65) Prior Publication Data

US 2023/0006392 A1 Jan. 5, 2023

(30) Foreign Application Priority Data

Jun. 30, 2021 (DE) ......................... 102021116837.6

(51) Int. Cl.
*H01R 13/514* (2006.01)
*H01R 12/73* (2011.01)
(Continued)

(52) U.S. Cl.
CPC ......... *H01R 13/514* (2013.01); *H01R 12/737* (2013.01); *H01R 13/46* (2013.01);
(Continued)

(58) Field of Classification Search
CPC .... H01R 13/514; H01R 12/737; H01R 13/46; H01R 13/502; H01R 43/0256;
(Continued)

(56) References Cited

U.S. PATENT DOCUMENTS

2020/0176918 A1* 6/2020 Wolf .................... H01R 13/518
2022/0077624 A1 3/2022 Böcker et al.

FOREIGN PATENT DOCUMENTS

DE 202013104811 U 11/2013
DE 102017119287 A1 2/2019
(Continued)

*Primary Examiner* — Justin M Kratt
(74) *Attorney, Agent, or Firm* — LAUBSCHER & FRETWELL, P.C.

(57) ABSTRACT

A connection strip is designed as a printed circuit board connector and has a strip-like connection housing, which is formed in one part or in a plurality of parts. The connection housing has a plurality of outer sides, the first outer side having a mating face side on which there are at least two or more mating face plug-in contacts, which can each be plugged together with a corresponding plug-in contact of a corresponding plug connector. The connection housing is further designed to have printed circuit board plug-in contacts on one, two or three of the other outer sides, which contacts project beyond the respective outer side so that on the one or more outer sides on which the printed circuit board plug-in contacts are provided, a printed circuit board can be soldered. A method for manufacturing the connection strip is also provided.

14 Claims, 10 Drawing Sheets

(51) Int. Cl.

*H01R 13/46* (2006.01)
*H01R 13/502* (2006.01)
*H01R 43/02* (2006.01)
*H01R 43/20* (2006.01)
*H01R 12/57* (2011.01)
*H01R 12/72* (2011.01)
*H01R 13/506* (2006.01)
*H01R 13/516* (2006.01)

(52) U.S. Cl.

CPC ....... *H01R 13/502* (2013.01); *H01R 43/0256* (2013.01); *H01R 43/20* (2013.01); *H01R 12/57* (2013.01); *H01R 12/724* (2013.01); *H01R 12/73* (2013.01); *H01R 12/735* (2013.01); *H01R 13/506* (2013.01); *H01R 13/516* (2013.01)

(58) Field of Classification Search

CPC ...... H01R 43/20; H01R 12/57; H01R 12/724; H01R 12/73; H01R 12/735; H01R 13/506; H01R 13/516

See application file for complete search history.

(56) References Cited

FOREIGN PATENT DOCUMENTS

| | | | | |
|---|---|---|---|---|
| DE | 102020123187 | A1 | | 3/2022 |
| JP | 63294675 | A | * | 12/1988 |
| JP | S63294675 | A | | 12/1988 |

* cited by examiner

CONNECTION STRIP AND METHOD OF MANUFACTURING THE CONNECTION STRIP

This application claims priority of German Patent Application No. 102021116837.6 filed Jun. 30, 2021, the entire contents of which are incorporated herein by reference.

BACKGROUND OF THE DISCLOSURE

The disclosure relates to a connection strip such as a printed circuit board connector, an arrangement with such a connection strip and a method for manufacturing the same.

Connection strips are known in a wide variety of configurations. Usually, however, the known connection strips cannot be adapted to different applications, or they can only be adapted to a very limited extent.

It is therefore the object of the present disclosure to provide an improved connection strip and a method for its manufacture to easily adapt the respective connection strip to different applications during its manufacture.

SUMMARY OF THE DISCLOSURE

Accordingly, it is an object of the present disclosure to provide a connection strip which is designed as a printed circuit board connector and has a strip-like connection housing including one or a plurality of parts. The connection housing has a plurality of outer sides, the first outer side having a mating face side on which there are at least two or more mating face plug-in contacts, which can each be connected with a plug-in contact of a corresponding plug connector. The connection housing is further designed to have printed circuit board plug-in contacts on one, two or more of the other outer sides. These contacts project beyond the respective outer side so that a printed circuit board can be attached on the one or more outer sides from which printed circuit board plug-in contacts project. In this way, plug connectors with different connection directions for connecting one or more printed circuit boards can be implemented in a simple manner.

The printed circuit board plug-in contacts are provided on at least two different outer sides and project outward from these outer sides of the connection housing so that at least two differently oriented printed circuit boards can be arranged on the connection housing.

According to a preferred embodiment, the printed circuit board plug-in contacts project from at least two parallel aligned outer sides of the connection housing, facing away from one another, so that at least two printed circuit boards aligned parallel in space can be arranged on the connection housing.

According to a preferred embodiment, the printed circuit board plug-in contacts project from at least two perpendicularly aligned outer sides of the connection housing, so that at least two perpendicularly aligned printed circuit boards can be arranged on the connection housing.

In a further embodiment, a third printed circuit board is provided on a further, third outer side.

In yet another embodiment, to easily attach printed circuit boards to a plurality of sides of the connection housing, the connection housings and/or individual connection housings have a generally cuboid configuration, including an upper side, a lower side, a mating face side, a back side and one or two connecting sides.

In order to provide variants of the printed circuit board connector, the printed circuit board plug-in contacts and the mating face plug-in contacts each preferably form the two ends of integrally formed contact pins that are inserted into the connection housing and are fixed thereto. It is then particularly advantageous for the printed circuit board plug-in contacts and the mating face plug-in contacts to each form the two ends of straight contact pins or the two ends of L-shaped contact pins. In this way, connection strips of various types can be manufactured in a simple manner such that printed circuit boards can be easily connected to them on different outer sides. The contact pins preferably have a square cross-section. However, they can also have a rectangular or other cross-section. The cross-section can be longitudinally constant, if necessary, except for the tapering ends. But it can also vary over the length.

The disclosure also provides an arrangement of a connection strip and at least two printed circuit boards, wherein the printed circuit board plug-in contacts project outward from at least two different outer sides of the connection strip, particularly the connection housing. On each of these sides a printed circuit board is soldered to the printed circuit board plug-in contacts.

In this case, printed circuit board plug-in contacts project from two outer sides of the connection housing and a printed circuit board is soldered to the printed circuit board plug-in contacts on each of these sides, so that the two printed circuit boards are aligned parallel to one another. Alternatively, male printed circuit board contacts project from the housing and a printed circuit board is soldered to the printed circuit board contacts on each of these sides, so that these two printed circuit boards are aligned perpendicularly to one another. Arrangements with three printed circuit boards can also be implemented.

The respective plug-in contact preferably penetrates the housing in at least one region, in particular in an inner wall region.

The optionally provided individual connection housings, also referred to herein as sub-housings, can be connected to one another and held securely to one another via corresponding mechanical connection mechanisms. These connection mechanisms can include one or more latching hooks and corresponding latching traps/recesses.

It is advantageous if the individual connection housings connected to one another are mechanically connected via corresponding mechanical connection mechanisms. That is, a first of the connection housings to be connected to one another in the connection direction has two lugs, one of which projects as an extension of an upper side and one projects as an extension of a lower side of the connection housing in the direction of an adjacent further connection housing, and the adjacent additional connection housing has a recess on the upper side and the lower side that corresponds to the lugs, in which the lugs of the adjacent first connection housing engage in a form-fitting manner when plugged together.

In this way, a simple yet secure connection of the individual connection housings lined up next to one another is provided, which leads to a good fit of the connection housing in the assembled connection strip.

In this case, however, the individual connection housings alternatively or additionally have further corresponding mechanically acting connection mechanisms. According to a further development, a tongue and groove connection is formed between one or both lugs and the corresponding recess(es).

In this way, a connection between aligned individual connection housings that is easy to assemble and yet particularly stable is realized, in which the individual connection housings in the connection strip can be secured multiple times and in a plurality of directions.

It is preferred that the individual connection housings are essentially cuboid and have an upper side, a lower side, a mating face side, a back side and two connecting sides.

According to a further development, on one or more of the respectively corresponding locking mechanisms, in particular on the locking projection, a bevel is formed to facilitate the locking process during assembly.

According to a further advantageous embodiment, the lugs and the recesses in the plane of the upper side or the lower side engage in a step-like form-fitting manner. In this way, a form fit is arranged in the plug-in direction.

According to a first embodiment, the connection strip can only have connection housings with the same mating faces. However, embodiments of connection strips can also be implemented in which the connection housings only partially have the same mating faces and partially have different mating faces. In this case, however, the connection devices are preferably nevertheless designed to be compatible.

It can be provided that at least one or more of the mating faces each have a contact pin, a socket contact and/or a shield contact.

The disclosure also provides a method for manufacturing connection strips configured according to one of the preceding embodiments, including at least the following steps: (1) providing one or more individual connection housings of the connection strip and providing the first type straight contact pins and the second type L-shaped contact pins; (2) mounting the straight or L-shaped contact pin(s) into the connection housing(s) or individual connection housings so that one end of each pin forms a mating face plug-in contact and the other end forms a printed circuit board contact pin; (3) if a plurality of the individual connection housings are provided on the respective printed circuit board connector, assembling the plurality of individual connection housings, which can be done before or after steps (1) or (2); and (4) mounting, in particular soldering, the one or more printed circuit boards to at least one of the outer sides having protruding circuit board contact pins of the connection housing.

With this method, not only can the respective individual circuit board connector be manufactured in a simple manner, but also a system made of a large number of different circuit board connectors can be realized or manufactured by repeatedly performing the method. The connectors of such a system differ by the connection direction relative to the printed circuit board or a plurality of circuit boards. For different connection directions toward the printed circuit board, contact pins of the same or possibly different type—in particular straight and/or L-shaped type—have to be mounted in the connection housings, which preferably include an identical construction.

BRIEF DESCRIPTION OF THE FIGURES

Other objects and advantages of the invention will become apparent from a study of the following description when viewed in the light of the accompanying drawing, in which.

DETAILED DESCRIPTION

Figure 1A:
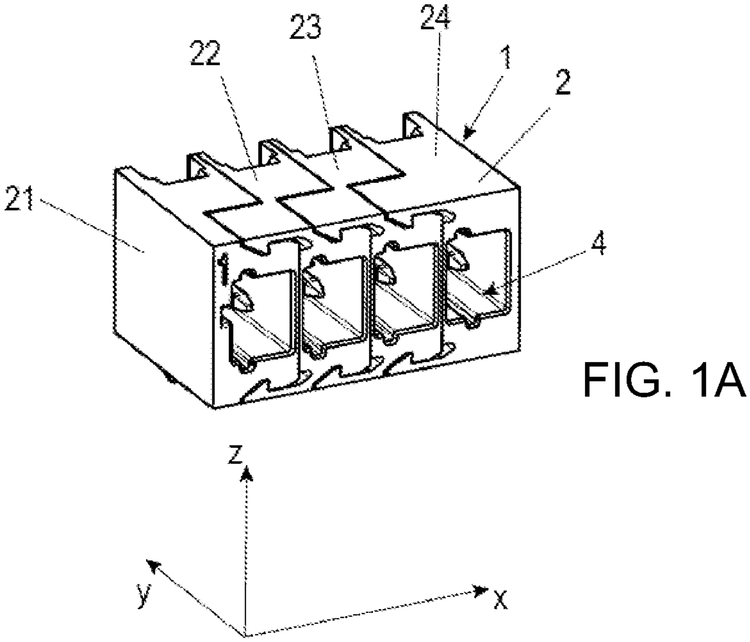
FIGS. 1A-1E are, a perspective view of a connection strip, the connection strip during an assembly step, a front view of the connection strip during assembly, a front view of an individual connection housing of the connection strip, and an enlarged front view of a portion of a connection housing, respectively.

FIG. 1 shows a first embodiment of a connection strip 1 designed as a printed circuit board connector. FIGS. 2-8 show variants of such connection strips 1, 100 which are designed or can be used as printed circuit board connectors. This means that they can be arranged on one or more printed circuit boards or can be arranged in an assembled state.

Each of the connection strips 1 has a strip-like connection housing 2. According to a first variant of the invention shown in FIGS. 1A-1E, this connection housing 2 is composed of a plurality of individual connection housings 21, 22, 23, 24, also referred to as sub-housings, which are lined up in a connection direction X.

The connection strip 1 has individual connection housings 22, 23 of the same type. However, as an alternative, it can also comprise individual connection housings of different types, such as with 21, 22, 23 and 24. According to other variations, as shown in FIGS. 7 and 8, the connection strip 100 has a connection housing 200 that is not composed of individual connection housings.

Connection housings of the same type are designed in the same way. Connection housings of different types differ in at least one technical detail.

What the connection housings 2, 200 and possibly the individual connection housings 21, 22, 23, 24 have in common is that they have an essentially cuboid shape with six outer sides. Minor deviations from the cuboid shape are possible, as explained below.

The multi-part or one-part connection housings 2, 200 are also designed so that one or more printed circuit boards LP1, LP2 can be arranged on at least one outer side (FIGS. 2B-2C) or on a plurality of outer sides (FIGS. 4A-4C, 6A-6D) of the housing, as described in more detail below.

Referring again to FIG. 1, adjacent outer sides of the individual connection housings 21, 22, 23, 24 are preferably aligned perpendicularly or substantially perpendicularly to one another. Each of the connection housings with the additional individual connection housings 21, 22, 23, 24 must be designed on at least one side in such a way that it can be connected with another adjacent individual connection housing.

This requires a connecting side 2*c*, 2*d* that is flat at least in sections and connection mechanisms for connecting to at least one adjacent individual connection housing 21, 22, 23, 24.

If the connection strip 1 is composed of a plurality of individual connection housings 21, 22, 23 (i.e. two or more individual connection housings), these individual connection housings 2, 21, 22, 23, 24 of same or different design have corresponding or compatible connection mechanisms, in order to line them up next to one another and mechanically connect them firmly to one another. These are also designed the same or compatible in the individual connection housings 21, 22, 23 of different types. These connection devices can be designed in different ways, as described in more detail below.

Figure 4A:
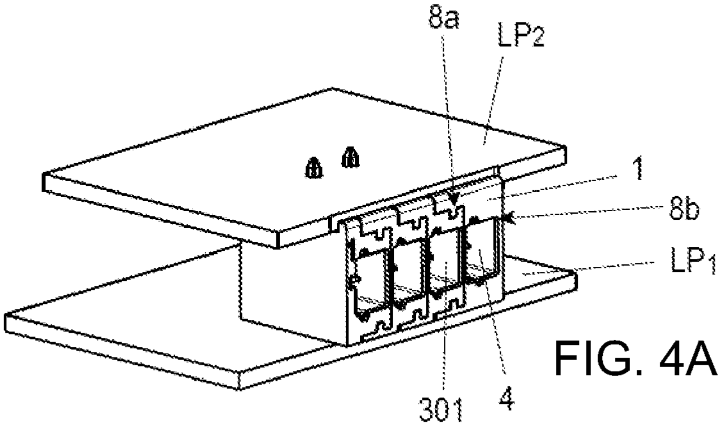
FIGS. 4A and 4B are front and rear perspective views, respectively, of the second connection strip from FIG. 3A arranged on two printed circuit boards aligned in parallel.
Figure 4B:
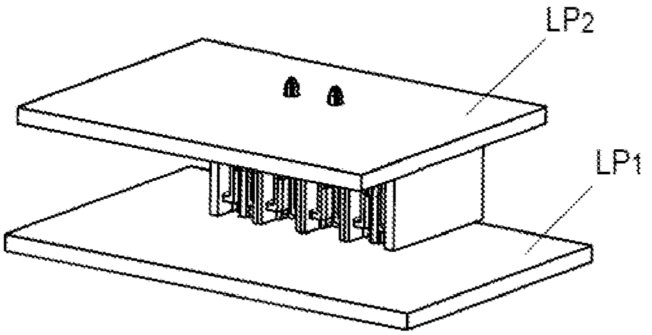
Figure 4C:
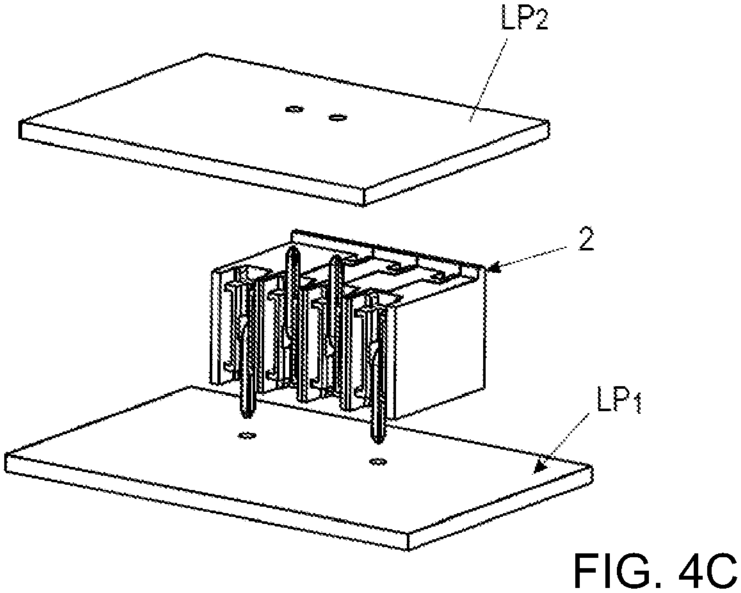
FIG. 4C is a rear perspective view of the connection strip of FIGS. 4A and 4B with the two printed circuit boards and the connection strip spaced apart prior to assembly.

As shown in FIGS. 2B-2D, 4A-4C, and 6A-6D, the connection strip 1 is or its connection housings 2 are preferably designed to be placed on a printed circuit board LP at one or more of its contact sides perpendicular or parallel to the connection direction X to be electrically connected thereto in the region of one or more contacts 301 (see FIG. 4).

Two or more printed circuit boards LP1, LP2 can be arranged on the connection strip 1 when contacts 301 are provided on a plurality of sides of the connection housing 2.

Figure 1B:
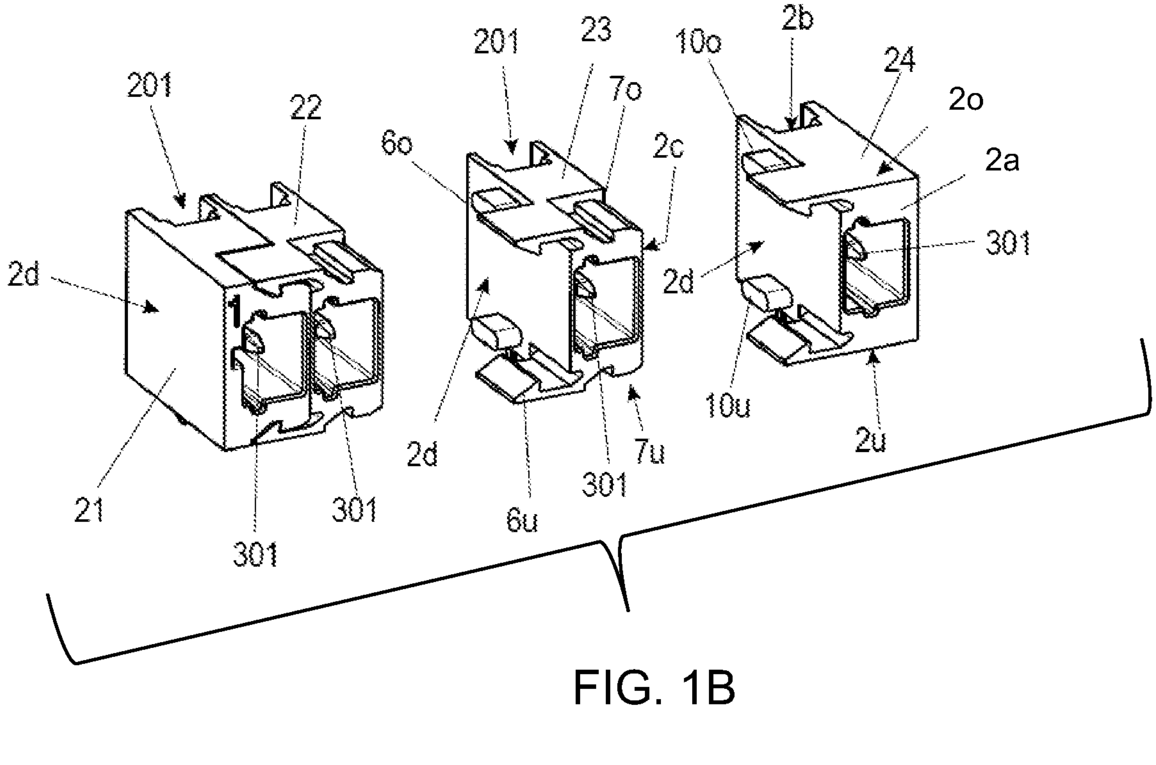
Figure 1C:
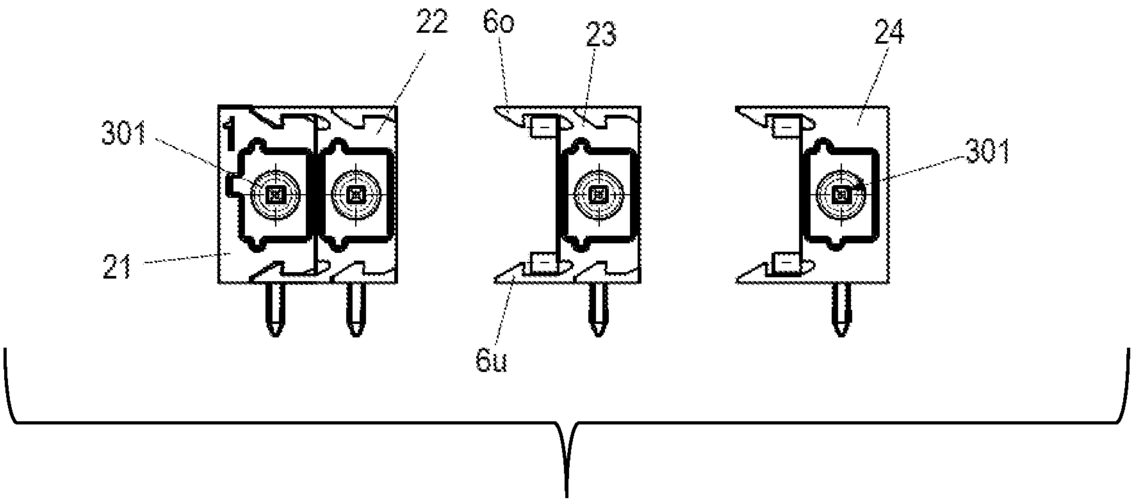
Figure 1D:
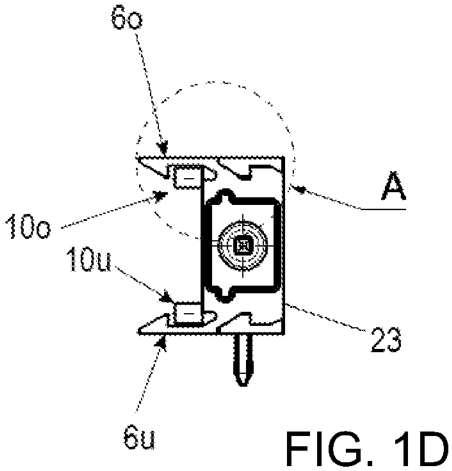
Figure 1E:
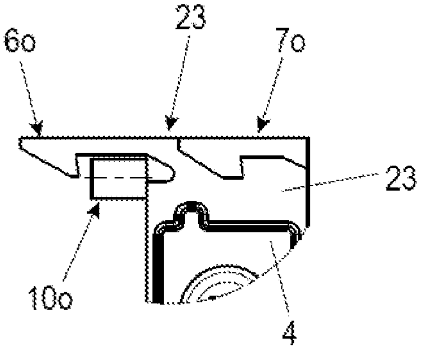

Referring to FIG. 1B, side walls 2*c*, 2*d*, also known as the first and second connecting sides, of the individual connection housings 21, 22, 23, 24 can be connected in the connection direction X.

The connection housings 2 also each have a mating face side 2*a* with a first plug-in contact 301—in particular a blade and/or contact pin—which can be connected to a corresponding plug-in contact such as a tulip contact of a corresponding plug connector (not shown). The mating face or connector side is also referred to as the connection side or front side, and the side of the connection housing 2 facing away from the connection side 2*a* is also referred to as the back side 2*b*. An intermediate wall can be provided between the connection side 2*a* and the back side. The arrangement can also be kinematically reversed.

In this case, the upper side 2*o*, the back side 2*b* and the lower side 2*u* are theoretically available for arranging printed circuit boards LP1, LP2 thereon or for arranging them on printed circuit boards LP1, LP2.

The corresponding plug connector (not shown) could also be designed for connection to a printed circuit board LP1 or LP2. A board-to-board connection (circuit board to circuit board via the plug-in connection) could be realized in this way.

In the following, the connection direction is denoted by X. The one direction perpendicular to the connection direction X, which runs from the lower side 2*u* to the upper side 2*o*, is denoted by Z and the further direction perpendicular to the connection direction X and to the Z direction, which runs from the connector side 2*a* to the back side 2*b*, is denoted as Y. The three directions X, Y, Z define a Cartesian coordinate system.

On each contact side—here the sides 2*u*, 2*o*, 2*b*—one or more contacts, in particular soldering pin contacts, are formed on the connection housing 2 projecting therefrom (see FIGS. 3 and 5).

The one or more soldering contacts can, for example and also preferably, be in the form of one or more printed circuit board plug-in contacts 302.

These circuit board plug-in contacts 302 on the respective contact side 2*u* project outward from the latter to be inserted into openings in a circuit board LP1, LP2 and soldered in place.

The contact pins of the connection housing are preferably formed in one part, which makes assembly easier. They are preferably formed from contact pins or contact blades. The terms contact blade and contact pin are also used synonymously in this application. The contact pins preferably have a square cross-section.

Referring again to FIGS. 1A and 1B, all connection housings 2 or a part of the connection housing 2 have/has a mating face side 2*a* in the manner of a first plug connection, which is designed for mating with a corresponding mating face of a corresponding connector (not shown).

For this purpose, the connection housings 2 can each have one or more openings 4, for example on the mating face side, which each delimit a chamber open on one side, in which one or more connection contacts is/are arranged. In a particularly preferred embodiment, these connection contacts are designed as one or more mating face plug-in contacts 301.

Figure 8A:
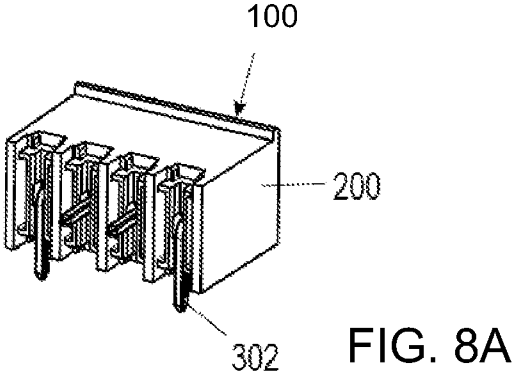
FIG. 8A is a rear perspective view of a fifth connection strip.
Figure 8B:
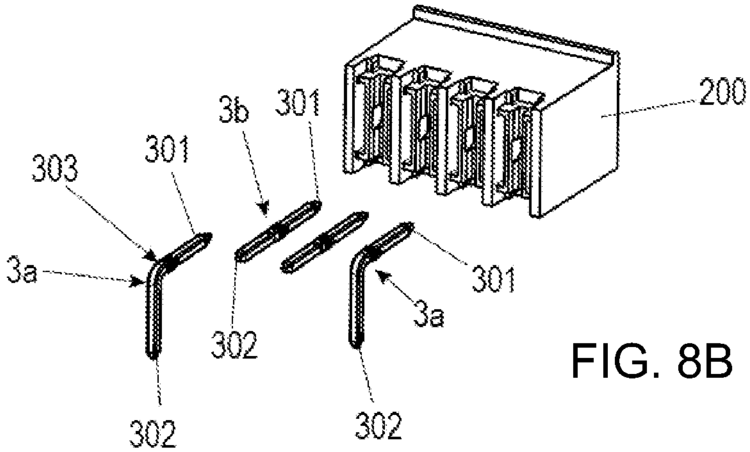
FIGS. 8B-8D are rear, top and side perspective views, respectively, of the connection strip from 8A during assembly of its contact pins.
Figure 8C:
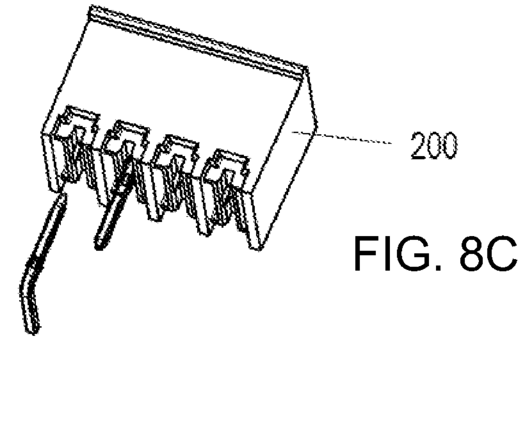
Figure 8D:
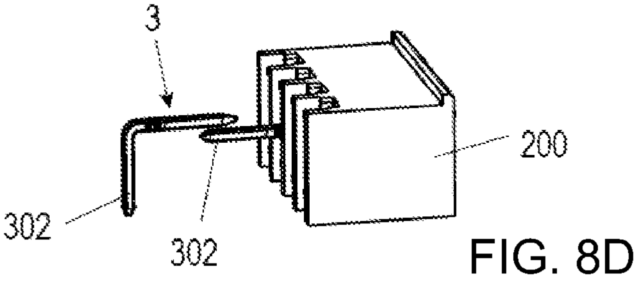

Contact pins 3 used as the contact elements are preferably provided in an L-shape, are a curvilinearly aligned contact pin variant 3*a* and/or are a straight contact pin variant 3*b* (see FIG. 8B).

Figure 2A:
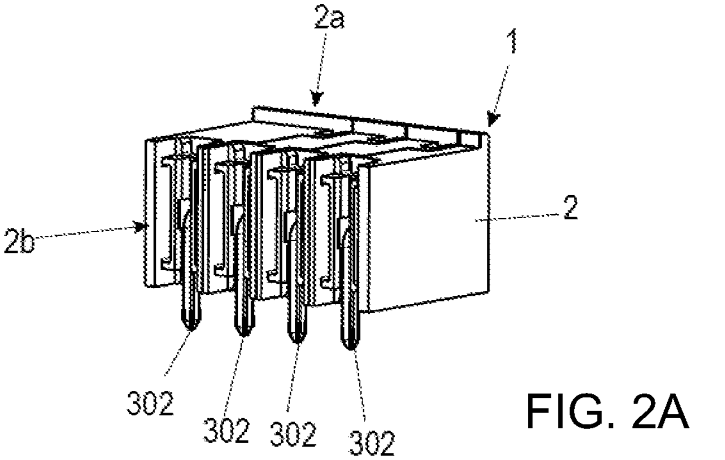
FIGS. 2A-2D are, a rear perspective view of the connection strip from FIG. 1A, a front perspective view of the connection strip arranged on a printed circuit board, a rear perspective view of the arrangement of connection strip and printed circuit board, and a rear perspective view of the printed circuit board and connection strip spaced apart prior to assembly, respectively.
Figure 3A:
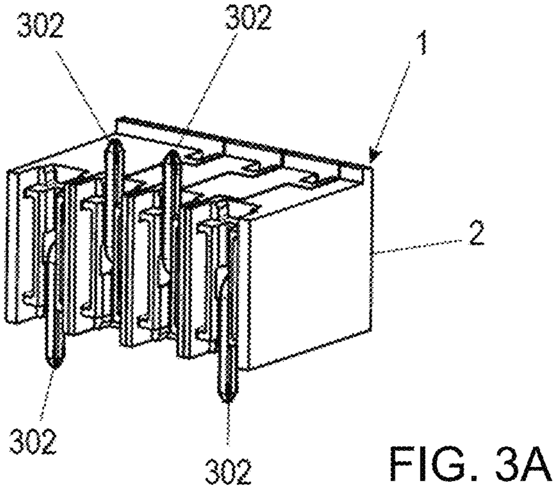
FIGS. 3A and 3B are a perspective view of a second connection strip and a perspective view of the individual connection housings spaced apart prior to assembly, respectively, wherein one of the connection housings is an exploded view.
Figure 3B:
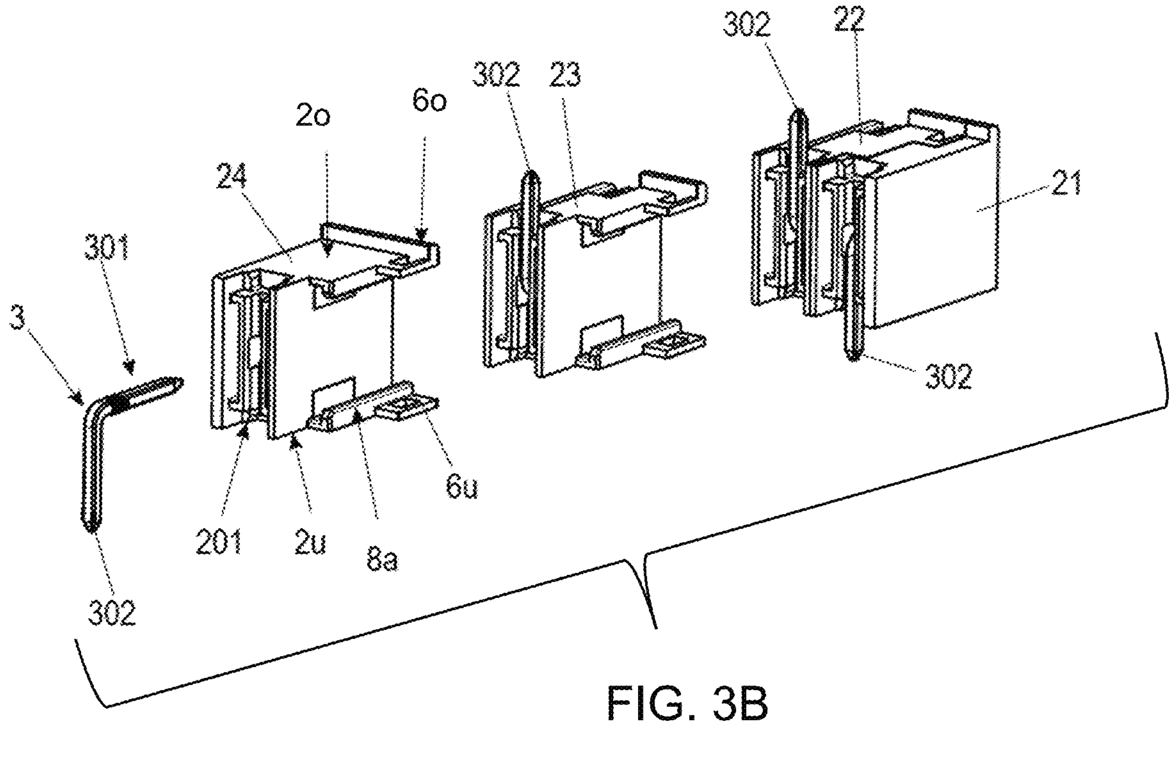

As shown in FIG. 3B, a first end of the contact pins 3 serves as a mating face plug-in contact 301 for connecting to corresponding mating face contacts, in particular tulip contacts, of a corresponding second connector (not shown here). The other end of the contact pins 3 is preferably used in each case as a printed circuit board plug-in contact 302 for contacting a respective printed circuit board LP1/LP2, as shown in FIGS. 2A and 4C.

The respective printed circuit board plug-in contact 302 and the corresponding mating face plug-in contact 301 are preferably designed in one part as the two ends of a single contact pin 3.

Instead of contact pins, blade contacts or tulip contacts (not shown) can also be provided on the connection or connector side 2*a*. Mixed forms with pin and tulip contacts on the connection side and/or shield contacts (see, for example, FIG. 2B) are also conceivable. The contact elements are nevertheless synonymously referred to as contact pins within the scope of this application and the claims.

The mating face sides 2*a* individually form a mating face on the individual connection housings 21, 22, 23, 24 and, in their interaction in the connection strip 1, also form a first overlapping mating face of a first connector, which can be plugged together with a corresponding second connector with a corresponding mating face. The mating faces of the connection housing 2 can be configured to be the same or different, in whole or in part.

According to preferred variants, the connection housings 2, 200 and possibly their individual connection housings 21, 22, 23, 24 are designed such that either exactly one contact pin 3 of the first variant 3*a* or the second variant 3*b* or a plurality of pins 3 of the first 3*a* and/or the second variant 3*b* can be inserted into them (see FIGS. 3, 5 and 8).

Figure 5A:
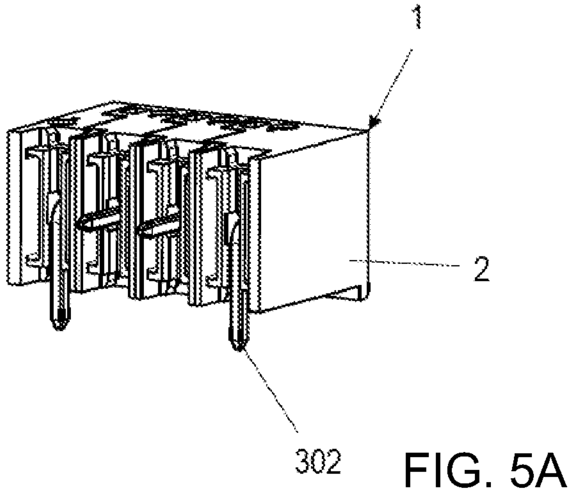
FIGS. 5A and 5B are perspective views of third and fourth connection strips, respectively.
Figure 5B:
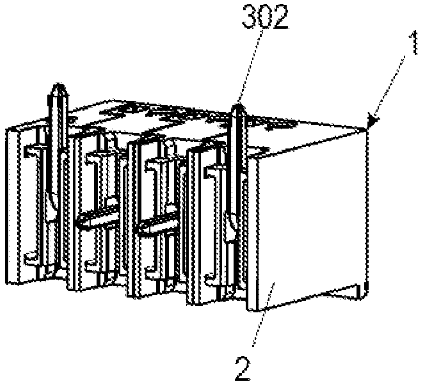
Figure 5C:
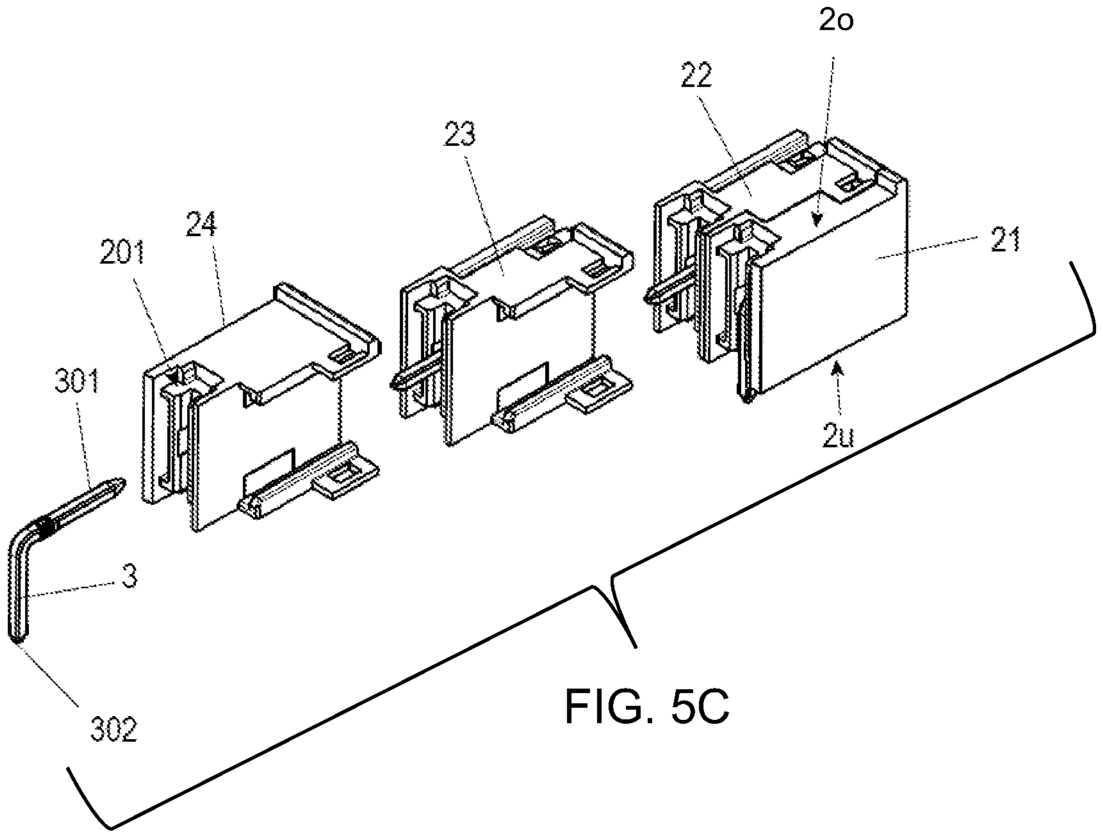
FIG. 5C is a perspective view of the third connection strip from FIG. 5A with the individual connection housings spaced apart prior to assembly, wherein one of the connection housings is an exploded view.

As shown in FIG. 5C, to facilitate assembly, it can be provided that the connection housings 2, 200 or, if applicable, their individual connection housings 21, 22, 23, 24, 200 each have a slightly central groove 201 on their back side, which allows the insertion of an L-shaped contact pin when the end that forms the printed circuit board plug-in contact 302 is aligned to the upper side 2*o* or lower side 2*u* of the connection housing 2.

The straight or L-shaped contact pins 3 can have a securing zone 303. This can be in the form of an embossing. In this region, they can be held/locked in a latching and/or clamped manner in the connection housing 2, 200 or, if applicable, in the individual connection housings 21, 22, 23, 24, for example in a mounting hole in an intermediate wall, which they penetrate in the respective connection housing 2, 200 or individual connection housing 21, 22, 23, 24.

It is also conceivable to manufacture the connection housing 200 as a higher-level housing, for example in one part (see FIG. 7 or 8) or from a lower part and an upper part (not shown here).

If the connection housings 2 are made in a plurality of parts from individual connection housings 21, 22, 23, 24, in order to connect the individual connection housings 21, 22, 23, 24 to one another in the connection direction X to form a stable and self-supporting connection strip 1, corresponding mechanically acting connection mechanisms, including latching and counter-latching mechanisms, are provided.

According to the variant of FIG. 1, these connection mechanisms can have two lugs 6*o*, 6*u* (see FIGS. 1B-1E and 2A-2D). One projects as an extension of the upper side 2*o* and the other as an extension of the lower side 2*u* of the respective individual connection housing 21, 22, 23, 24 opposite the connection direction X (or alternatively in the connection direction X, not shown here) and in the direction of a respectively adjacent connection housing 21, 22, 23, 24.

The corresponding connection mechanisms also have respective recesses 7*o*, 7*u* on the upper side 2*o* and the lower side 2*u* corresponding to the lugs 6*o*, 6*u*, with which the lugs 6*a*, 6*b* of the adjacent individual connection housings 2 engage.

The lugs 6*o*, 6*u* and the corresponding recesses 7*o*, 7*u* preferably do not extend over the entire length of the individual connection housing 2 in the plug-in direction Y.

According to a preferred variant shown in FIGS. 1B-1E, the individual connection housings 21, 22, 23, 24 have pegs or pins 10*o*, 10*u* projecting in the connection direction X, as an alternative or in addition to the first and second latching mechanisms, which are formed to engage in corresponding receiving holes. Since the pins 10*o*, 10*u* are preferably over-sized in relation to the receiving holes, the individual connection housings 21, 22, 23, 24 are seated in a clamped manner by the pins and the pegs. It is also possible for only pins 10*o*, 10*u* or their corresponding holes to be formed on the first and last individual connection housings 21, 24 of a connection strip.

A gradation with the lugs 6*o*, 6*u* and the recesses 7*o*, 7*u* results in the aligned connection housings 2 being secured in a form-fitting manner in the z direction and in the plug-in direction y.

In the z-direction the lugs 6*o*, 6*u* and the recesses 7*o*, 7*u* secure the connection housing 2 of the connection strip 1 arranged between them against relative displacement in the "assembled" connection strip 1. In the plug-in direction Y, the gradation may lead to form-fitting contact in one direction.

Preferably, the lugs 6*o*, 6*u* are also designed as first latching mechanisms and the recesses 7*o*, 7*u* as counter-latching mechanisms in order to secure the individual connection housings 21, 23, 23, 24 against being pulled apart in and against the X direction.

As shown in FIGS. 3 and 5, to also secure the individual connection housings 2 relative to one another against the plug-in direction Y and in the connection direction X in the region of the lugs or webs 6*o*, 6*u* and recesses 7*o*, 7*u* there are corresponding tongue and groove connections 8*a*, 8*b* that correspond to latching mechanisms and counter-latching mechanisms.

As can be seen clearly in FIGS. 3A and 3B, this connection secures adjacent individual connection housings very well in the connection direction, because it easily secures them against being pulled apart parallel to the connection direction X.

In this way, adjacent individual connection housings 21, 22, 23, 24 can also be easily lined up perpendicularly to the connection direction X in the plug-in direction Y when mounting the connection strip 1 by pushing them together so that the tongue and groove connections engage. The positive fit secures adjacent individual connection housings against being pulled apart in or against the connection direction (see FIGS. 2A and 2B or 3A, 3B, 3C).

It can be provided that only lugs or recesses 6*o*, 7*u* or 7*o*, 7*u* are provided on the first and last individual connection housings 21, 24 of the connection strip 1, since the last individual connection housing 24 of the connection strip can only be connected in one connection direction to an adjacent Individual connection housing 23.

Alternatively or in addition, clamping pins 10*o*, 10*u* (see FIG. 1B) and clamping holes (not shown or not visible in the views shown) can be formed on the corresponding connecting sides 2*c*, 2*d*, which then hold together and secure the individual connection housings 21, 22, 23, 24 alternatively or additionally in the connection direction X.

It should be particularly emphasized that the contact pin variants 3*a*, 3*b* can be used to manufacture connection strips 1 and circuit board connectors of various types.

This is because with the straight 3*b* and/or the L-shaped 3*a* contact pin variants, one or more printed circuit board plug-in contacts 302 can be provided for connection to one or more printed circuit boards LP1, LP2 in the Y, +Z or −Z directions.

With the connection housings 2, 200 or possibly individual connection housings 21, 22, 23, 24, circuit board connectors of different designs can thus be manufactured in a simple manner, which have one or more connection directions or connection sides for printed circuit boards LP1, LP2. For this purpose, the connection housing 2, 200 or possibly individual connection housings 21, 22, 23, 24 may be equipped with one or both of the contact pin variants 3*a*, 3*b* as desired.

The connection housings 2, 200 or possibly individual connection housings 21, 22, 23, 24 are preferably made of a non-conductive plastic. The contact pins 3 are preferably made of a highly electrically conductive metal material.

Steps for a preferred manufacturing process of the above described embodiments includes the following steps described below (which preferably follow one another).

First, the connection housing 2, 200 or the individual connection housings 21, 22, 23, 24 of the connection strip 2, 200 are manufactured in advance. These are then provided for further assembly. Manufacturing can be done, for example, by a plastic injection molding step. In addition, the conductive contact pins 3 are manufactured.

Second, the L-shaped and/or straight contact pins 3 are then mounted in the provided insulating connection housings 2, 200 or individual connection housings 21, 22, 23, 24 with an installation tool, in particular by an insertion process, so that one end forms a mating face plug-in contact 301 and the other end forms a printed circuit board contact pin 302.

Third, if a plurality of individual connection housings 21, 22, 23, 24 are provided with a connection strip 1, the plurality of connection housings are assembled to form the higher-level connection housing 2 prior to or after one of the above-described steps.

Lastly, the one or more printed circuit boards LP1, LP2 are mounted, in particular soldered on the one or possibly the several outer sides that have the above circuit board contact pins 310 on the connection housing 2, 200.

Depending on requirements at the installation site, the same or different variants of connection strips 1 can be formed in which all circuit board plug-in contacts 302 point in the same direction, such as towards the back side (Y-direction) or up or down (+Z-direction or −Z-direction), as shown in FIGS. 1A-1E and FIGS. 2A-2D.

However, variants of connection strips 1 can also be formed in which a first part of the printed circuit board plug-in contacts 302 points in a first direction, towards the back side, upwards or downwards, and a second part of the printed circuit board contact pins points in at least one other direction, such as toward the back side or toward the upper or lower sides.

Figure 6A:
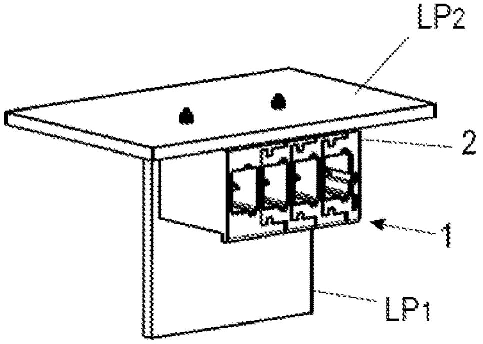
FIGS. 6A and 6B are front and rear perspective views, respectively, of the third connection strip from FIG. 5A arranged on two printed circuit boards that are perpendicularly aligned.
Figure 6B:
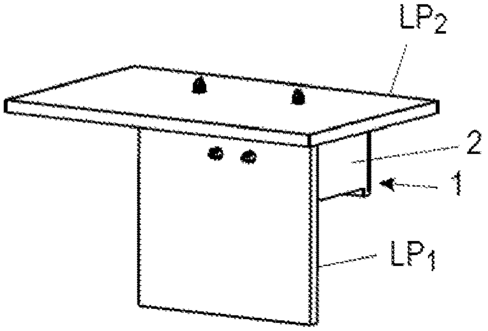
Figure 6C:
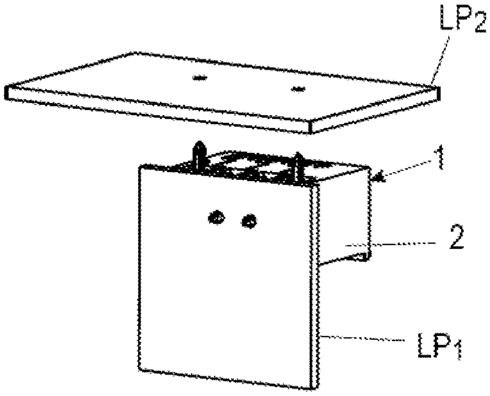
FIGS. 6C and 6D are rear perspective views of the connection strip and circuit boards of FIGS. 6A and 6B with one circuit board spaced apart from the connection strip prior to assembly and both printed circuit boards spaced apart, respectively.
Figure 6D:
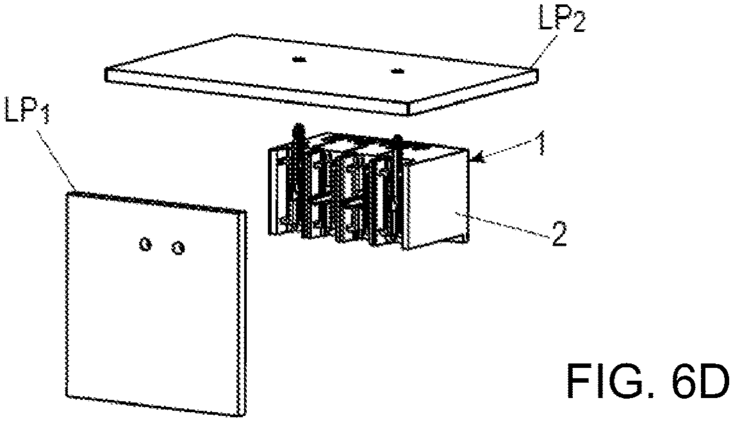
Figure 7A:
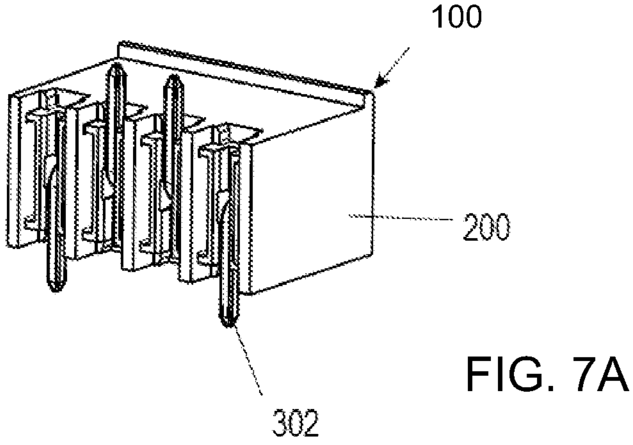
FIG. 7A is a rear perspective view of a fourth connection strip.
Figure 7B:
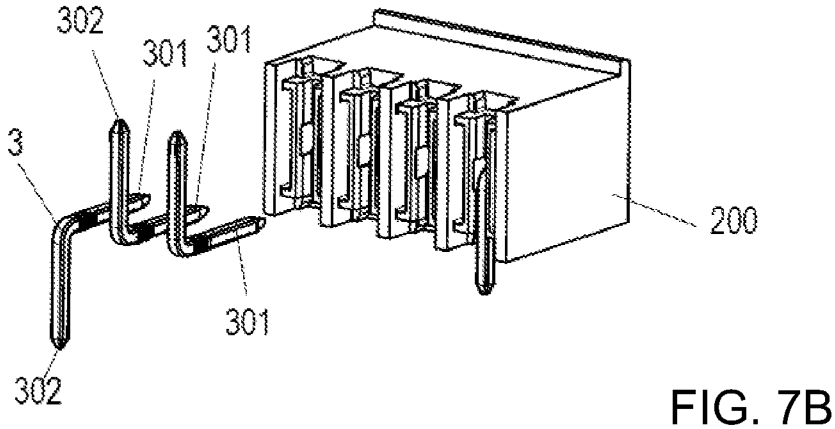
FIGS. 7B and 7C are rear and side perspective views, respectively, of the connection strip from 7A during assembly of its contact pins.
Figure 7C:
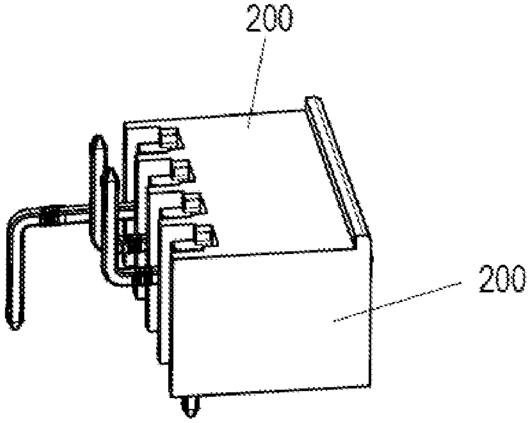

For example, a part of the contact pins can project straight back from the back side and a second part of the contact pins can be oriented downwards (see FIG. 5A, FIGS. 8A-8D) or upwards (see FIG. 5B, FIG. 6D). However, a first part of the contact pins can also be directed upwards and a second part of the contact pins downwards (see FIGS. 3A-3B, 4A-4C and 7A-7C).

According to the number of housing sides on which printed circuit board plug-in contacts 302 are provided, many printed circuit boards LP1, LP2 can then be provided on the connection housing, namely one, two or more printed circuit boards.

Exemplary and advantageous variants include but are not limited to those detailed below, as previously described above.

Figure 2B:
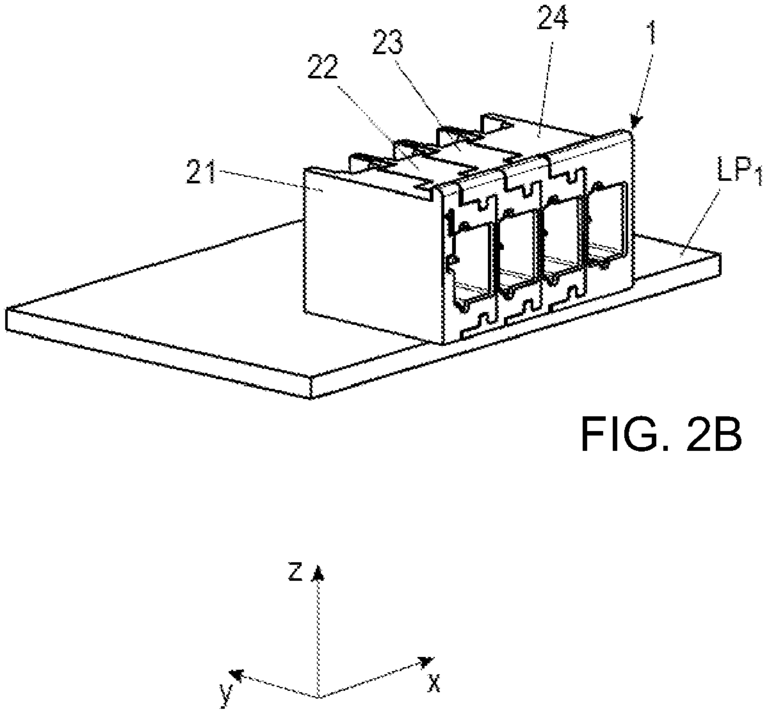
Figure 2C:
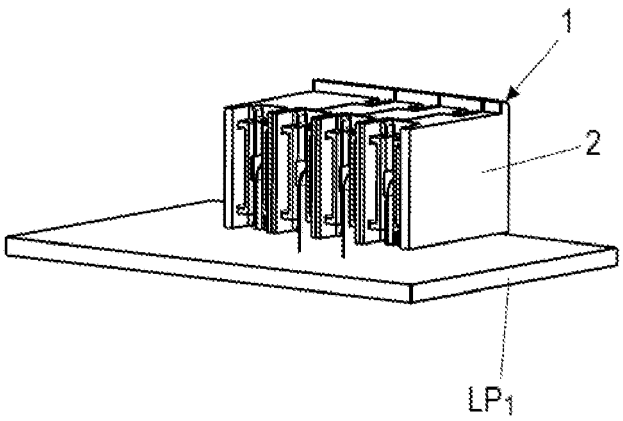
Figure 2D:
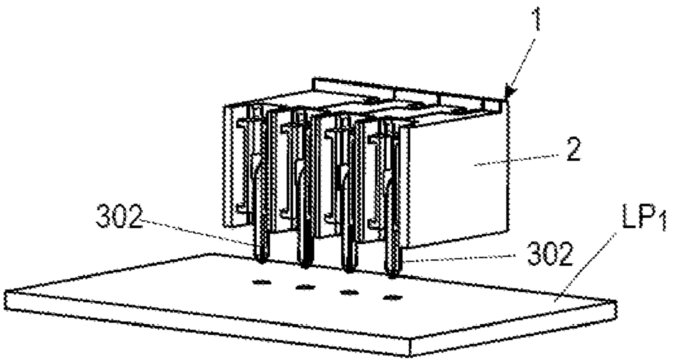

In FIG. 2*b* all printed circuit board plug-in contacts 302 are directed towards the lower side 2*u*, and correspondingly a lower printed circuit board LP1 is provided on the lower side of the printed circuit board connector 1.

In FIGS. 4A-4C a first part of the printed circuit board plug-in contacts 302 is directed towards the lower side 2*u*, a second part of the printed circuit board plug-in contacts 302 is directed towards the upper side 2*o*, a lower circuit board LP1 is provided on the lower side of the printed circuit board connector and an upper parallel circuit board LP2 is provided on the upper side of the printed circuit board connector 1.

In FIGS. 6A-6C a first part of the printed circuit board plug-in contacts 302 is directed towards the upper side 2*o*, a second part of the printed circuit board plug-in contacts 302 is directed towards the back side 2*b*, an upper circuit board LP1 is provided on the upper side of the printed circuit board connector and a second back board LP2 at right angles thereto is provided at the back side 2*b* of the printed circuit board connector 1.

These are some particularly preferred variants; other variants, which are not shown, can also be implemented if the contact pins 3 are installed appropriately.

What is claimed is:

1. An arrangement comprising a connection strip and at least two printed circuit boards, the connection strip including:

(a) a housing having a plurality of side walls, a first side wall defining a mating side wall including at least two plug-in contacts for connection with corresponding plug-in contacts of a corresponding plug connector; and (b) at least two printed circuit board plug-in contacts projecting beyond at least two side walls of said plurality of side walls, at least one of said printed circuit board plug-in contacts being arrangeable to project in one of at least two variable directions beyond a side wall of said at least two side walls, said at least two printed circuit boards being connected with said at least two printed circuit board plug-in contacts.

2. The arrangement of claim 1, wherein said at least two printed circuit board plug-in contacts projecting beyond at least two sidewalls are connected with at least two differently oriented printed circuit boards.

3. The arrangement of claim 1, wherein said connection housing comprises a plurality of individual sub-housings connected to one another, each said sub-housing having a plurality of side walls and at least one connection mechanism for connecting one sub-housing with another, including:

(a) a first individual sub-housing having two lugs projecting from respective upper and lower side walls of said plurality of side walls; and (b) at least one additional individual sub-housing having upper and lower side walls containing respective recesses corresponding to and configured to connect with said two lugs.

4. The arrangement of claim 3, wherein said plurality of individual sub-housings have at least one additional connection mechanism.

5. The arrangement of claim 3, wherein said plurality of individual sub-housings each have a generally cuboid configuration having an upper side, a lower side, a mating face side, a back side and at least one connection side.

6. The arrangement of claim 3, wherein each said mating side wall plug-in contact and each said printed circuit board plug-in contact form respective ends of an integral contact pin which is connected with said connection housing.

7. The arrangement of claim 6, wherein said integral contact pin has a generally straight configuration.

8. The arrangement of claim 6, wherein said integral contact pin has a generally L-shaped configuration.

9. The arrangement of claim 1, wherein said at least two printed circuit board plug-in contacts project beyond at least two opposite side walls of said connection housing, said at least two printed circuit boards being connected to respective circuit board plug-in contacts such that said at least two printed circuit boards are aligned in parallel.

10. The arrangement of claim 1, wherein said at least two printed circuit board plug-in contacts project beyond at least two mutually perpendicular side walls of the connection housing, said at least two printed circuit boards being connected to respective circuit board plug-in contacts such that said at least two printed circuit boards are perpendicularly aligned.

11. A method for manufacturing the connection strip of the arrangement of claim 1, comprising the steps of:

(a) providing one of a connection housing and plurality of individual sub-housings of the connection strip and at least one of a straight contact pin and an L-shaped contact pin;

(b) mounting the at least one straight or L-shaped contact pin into the connection housing or individual connection housings, wherein one end of each pin forms a mating side wall plug-in contact pin and the other end forms a printed circuit board contact pin;

(c) if a plurality of individual sub-housings are provided, assembling the plurality of individual sub-housings;

(d) mounting at least one printed circuit board to a side of the connection strip having printed circuit board contact pins.

12. The method of claim 11, wherein assembling the plurality of individual sub-housings is completed prior to providing the individual sub-housings.

13. The method of claim 11, wherein assembling the plurality of individual sub-housings is completed prior to mounting the at least one straight or L-shaped contact pin.

14. The arrangement of claim 1, wherein said housing is formed via at least two detachable sub-housings, each said sub-housing having a plurality of side walls, a first side wall including one of said at least two plug-in contacts, a second side wall having a connection mechanism for connecting one sub-housing with another to form said housing, each said sub-housing further including at least one of said at least two printed circuit board plug-in contacts.

* * * * *